Jan. 2, 1962  F. G. KRAFFT ET AL  3,015,212
PUMP CONTROL
Original Filed June 26, 1957  3 Sheets-Sheet 2
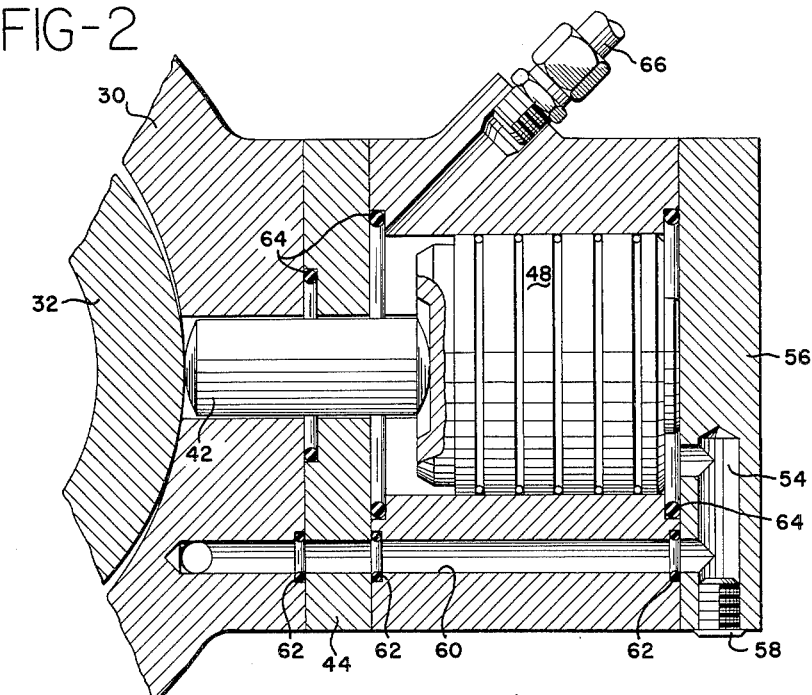
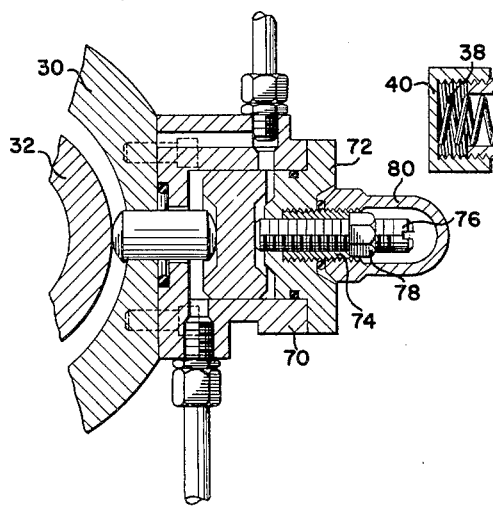
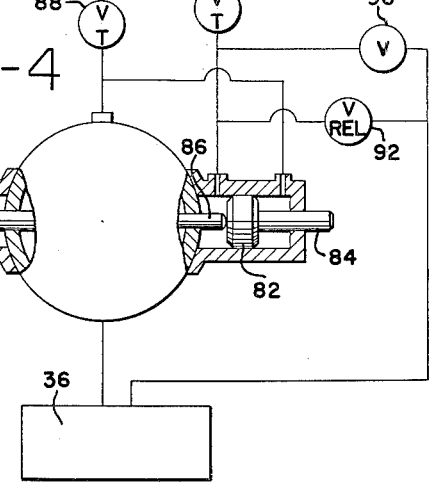
*INVENTORS*
FREDERICK G. KRAFFT
WALTER ERNST
BY
ATTORNEYS

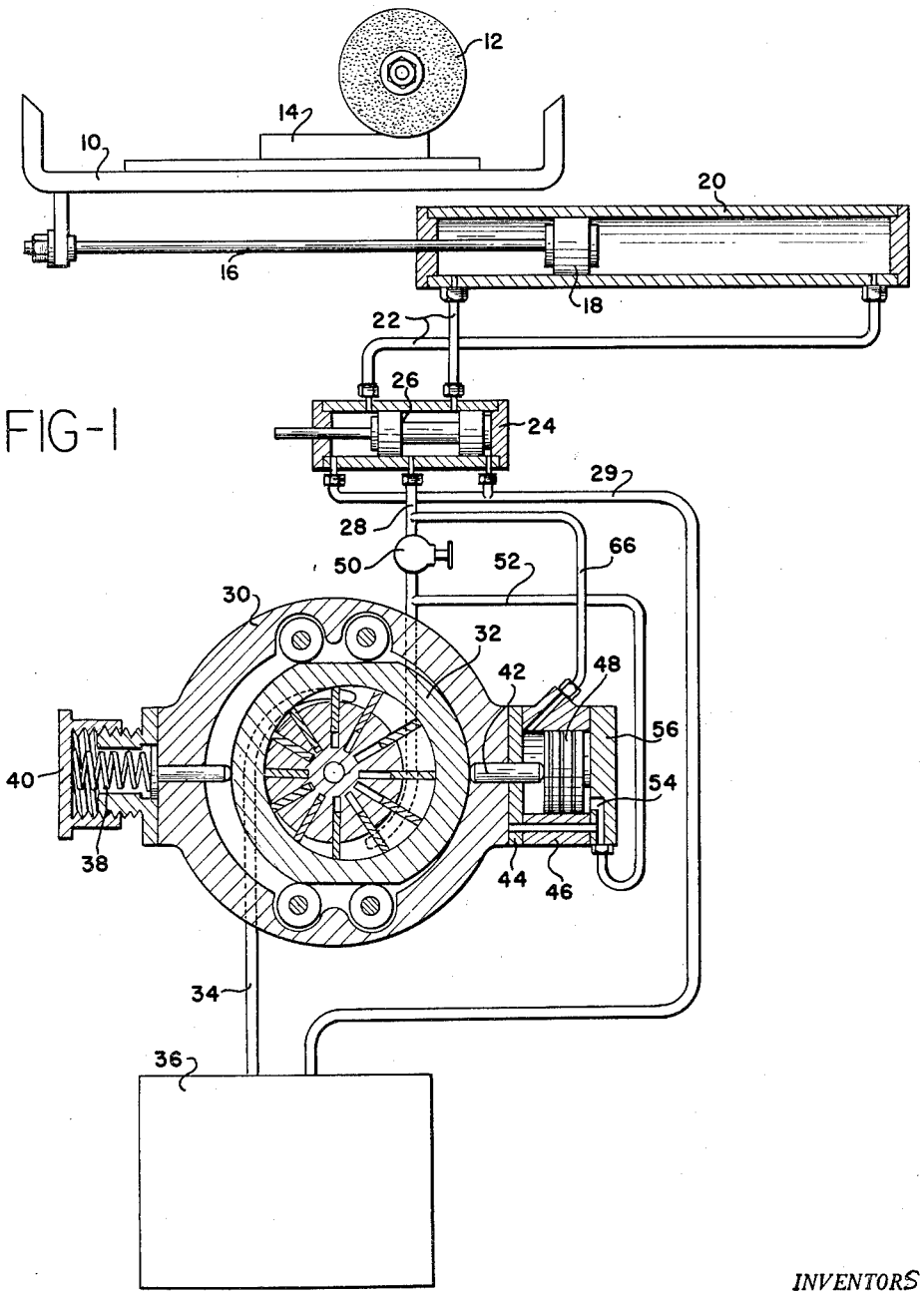

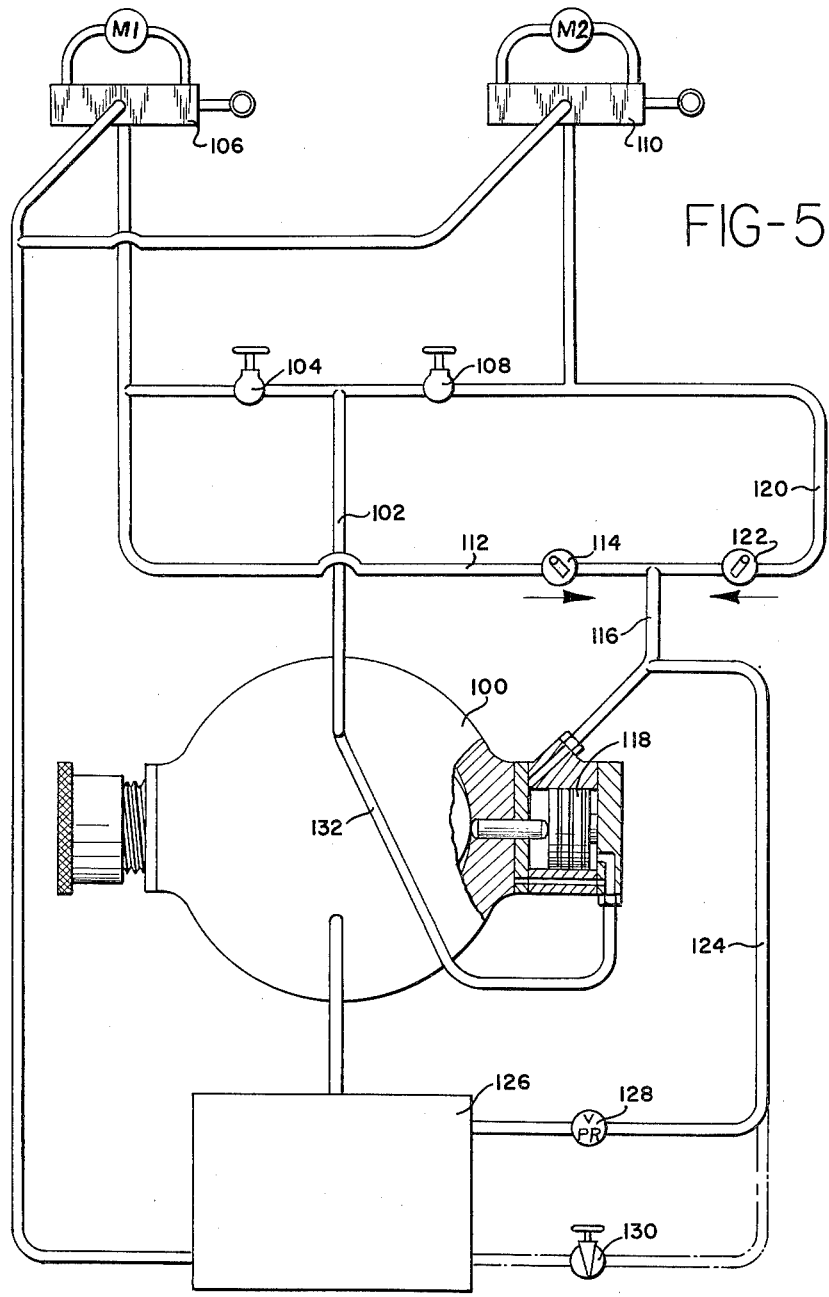

United States Patent Office 3,015,212
Patented Jan. 2, 1962

3,015,212
PUMP CONTROL
Frederick G. Krafft, Springfield, and Walter Ernst, Dayton, Ohio, assignors to The Thompson Grinder Company, Springfield, Ohio
Original application June 26, 1957, Ser. No. 668,215, now Patent No. 2,921,439, dated Jan. 19, 1960. Divided and this application Dec. 31, 1959, Ser. No. 863,279
5 Claims. (Cl. 60—52)

This invention relates to pump controls and to hydraulic circuits embodying such controls and to a combination pump and control unit. More particularly still, the present invention relates to speed controls for hydraulically driven machine elements and to delivery control arrangements for variable delivery hydraulic pumps.

This application is a division of my co-pending application Serial No. 668,215, filed June 26, 1957, entitled Pump Control, issued as U.S. Patent 2,921,439.

A great many machines, such as machine tools, are provided with hydraulic drives in which a hydraulic pump, usually driven at constant speed by an electric motor, supplies fluid to a hydraulic motor which, in turn, is connected to the machine element that is to be driven. This arrangement provides for a convenient means of delivering power to the desired location and provides for a flexible driving means in that the speed of the driven element can readily be adjusted. While the speed of the driven element can be adjusted, however, the maintaining of the speed of the driven element constant within relatively close limits is not so easily accomplished and, where the element meets a varying load, it undergoes speed changes accordingly.

One manner in which the speed of a driven element is varied is by throttling the delivery of fluid to the driven elements, or by bypassing a portion of the pump delivery to exhaust. Since the pumping unit must be so devised that it can deliver the maximum pressure required and must be capable of delivery the maximum quantity required, it follows that either the throttling of the pump discharge, or the bypassing of a portion of the delivery thereof, is accompanied by considerable power loss, which power loss is converted into heat directly within the hydraulic medium that is being employed.

The heating of the hydraulic medium is never desirable and is particularly objectionable in the case of precision machine tools, such as grinding machines and the like, wherein the creation of heat in certain areas of the machine is apt to lead to warping of the machine frame and subsequent inaccuracies in the finished workpieces.

Having the foregoing in mind, it is an object of the present invention to provide a control arrangement for a hydraulic pump which will maintain a substantially constant rate of discharge therefrom but which will do so without causing excessive heating of the hydraulic medium being pumped and without the loss of any substantial amount of power.

A still further object of this invention is the provision of a hydraulic system for a machine tool, such as a grinding machine, in which the hydraulically-driven machine element can be operated at constant speed throughout its travel and in which the said speed can readily be predetermined and which will be maintained without loss of power or heating of the hydraulic medium.

A still further object is the provision of a combination pump and control therefor in which the rate of delivery from the pump can be maintained constant at substantially any quantity between the minimum and maximum capacities of the pump and without substantial loss of power or heating of the hydraulic medium.

A still further object of the present invention is the provision of a control unit adapted for being mounted in association with a variable delivery pump having a shiftable blow control member and which unit is capable of maintaining the rate of discharge from the pump substantially constant under varying load.

A still further object of this invention is the provision of a control system for a variable delivery pump which will maintain the delivery of the pump substantially constant regardless of the discharge pressure of the pump but which system includes protection against excessive pressures being developed by the pump.

Another object of this invention is the provision of a constant delivery control arrangement for a variable delivery pump in which the pump is arranged to idle under substantially zero discharge-zero pressure conditions when under no load.

These and other objects and advantages will become more apparent upon reference to the accompanying drawings in which:

FIGURE 1 is a rather diagrammatic view showing a surface grinder having a bed reciprocating motor connected with a variable delivery hydraulic pump in which the present invention is embodied;

FIGURE 2 is a view showing at enlarged scale the control unit associated with the pump;

FIGURE 3 is a view showing a modified form which a control unit according to the present invention can take;

FIGURE 4 is a diagrammatic view showing a further modification of the control unit and also showing a circuit adapted for use with any of the control units disclosed herein; and FIGURE 5 is a diagrammatic view showing how a single pump can be arranged to supply a plurality of motors and having a flow control arrangement according to the present invention.

Referring to the drawings more in detail, FIGURE 1 shows a grinding wheel table 10 adapted for reciprocating beneath a grinding wheel 12 so that the workpiece 14 on the table can be ground by the wheel.

Table 10 has connected thereto piston rod 16 that has thereon a piston 18 located in cylinder 20.

The opposite ends of cylinder 20 are connected by the conduits 22 with the service ports of a reversing valve 24. A valve member 26 in the valve is movable for alternately connecting the conduits 22 with the pressure supply conduit 28 while connecting the other of the conduits 22 with exhaust conduit 29. Conduit 28 leads to the discharge side of a variable delivery pump 30 which has a shiftable flow control member 32 therein. The suction side of the pump is connected by conduit 34 with reservoir 36.

The flow control member 32 is adapted for being normally biased rightwardly toward maximum stroke position by a spring 38 on the left side of the pump. The initial bias of spring 38 is adapted for being adjusted by adjustable cap 40.

The opposite side of the pump shift ring 32 is engaged by a plunger 42 that extends through a central aperture in a plate 44 into a cylinder 46. Mounted within cylinder 46 is a piston 48 that engages the outer end of plunger 42.

The aforementioned conduit 28 includes therein a throttle valve 50 and the upstream side of this throttle valve, and which is the discharge side of the pump, is connected by conduit 52 with the right side of piston 48. As illustrated in FIGURE 1, the conduit 52 may be connected with the right end of cylinder 46 by passage 54 formed in the plate 56 that is the closure member for the right end of the cylinder. However, the connection of the right end of cylinder 46 with the discharge side of the pump may be accomplished internally of the pump, as illustrated in FIGURE 2, where it will be seen that passage 54 in plate 56 is closed by a plug 58 at its outer end while a passage 60 extends from passage 54 lengthwise through the wall of the cylinder portion and then through plate 44 to the body of the pump and therein is connected with the pump discharge.

As will also be seen in FIGURE 2, the passage 60 is surrounded by O-rings 62 where the cylinder meets the plates, and where plate 44 engages the body of the pump. Similarly, the O-rings 64 are provided between the aforementioned plates and the cylinder and the pump casing thereby sealing the entire assembly against leakage.

The arrangement described provides for maintaining a substantially constant rate of discharge from the pump with a small pressure drop across valve 50.

The downstream side of the aforementioned throttle valve 50 is connected by conduit 66 with a passage leading through the wall of the cylinder to the extreme left end of the cylinder. This supplies to the left side of piston 48 a pressure that is the same as the pressure supplied to the load and which pressure is less than the pump discharge pressure by the pressure developed across the throttle valve.

The arrangement described above provides for substantially constant speed of travel of table 10 independent of system pressure and substantially independent of fluctuations in system pressure. The table speed is thus substantially independent of load and can be depended on to maintain the table 10 at a constant rate of speed throughout the work operation, particularly where the load on the table does not vary widely as in the case of the grinding machine illustrated.

The foregoing action comes about in response to a relatively small pressure drop across throttle valve 50 whereby substantially little power is lost and also whereby there is minimum amount of heat developed in the hydraulic medium.

Reference to FIGURE 1 will show that the pressure on the upstream side of the throttle valve is delivered to the right face of piston 48, thus urging the piston leftwardly in a direction to reduce the stroke of the pump. Simultaneously, the pressure on the downstream side of the pump is delivered to the left face of piston 48 and this pressure tends to hold the pump in maximum stroke position. The actual thrust developed is measured by the area of piston 48, minus the area of plunger 42, multiplied by the pressure drop across the throttle valve. It will be apparent that a selection of piston 48 can be made such that the pressure drop across the throttle valve is quite small. The power loss accompanying the throttling of the pump delivery is thus relatively small and the pump will shift toward neutral when the control pressure reaches a predetermined amount thereby decreasing the load on the motor instead of converting the excess power into heat.

It will be apparent, that since the control pressure is a function of the pressure drop across the throttle valve, this control pressure is substantially independent of system pressure and instead depends merely on the rate of fluid flow through the throttle valve and which rate of fluid flow corresponds to the rate of movement of the driven member that is being controlled.

The structure of FIGURE 3 is similar to the one already described, except that in FIGURE 3, the cylinder 70 is formed integrally with the portion thereof that attaches to the pump and the closure member at the outer end of the cylinder at 72 is telescopically fit into the end of the cylinder. The member 72 also carries a threaded sleeve 74 in which is threaded an abutment screw 76 that limits the maximum stroke of the pump. Nut 78 locks screw 76 in position and cap 80 mounted on the end of sleeve 74 seals the unit against leakage.

The two modifications described above are substantially identical and both are applicable to practically all circumstances. It is possible, however, that under certain conditions where the pump discharge pressure will vary widely, or extremely high pressures are encountered, that added compensation will be required to offset the tendencies of the pump to shift toward neutral under load. This is a characteristic of a vane pump of the type illustrated in FIGURE 1, and of certain other types of pump, such as radial piston pumps. These pumps have a thrust developed therein tending to move them off stroke and which thrust varies directly with the discharge pressure of the pump.

The circuit of FIGURE 4 discloses an arrangement for compensating for the load on the pump. This is accomplished by providing the control piston 82 with a tail rod 84 of such a size that the difference in area between the tail rod 84 and the plunger 86 is just sufficient to compensate for the tendency of the pump to move off stroke due to its internal pressure.

In the FIGURE 4 arrangement the pressure upstream of the throttle valve 88 is thus impressed on an area equal to the difference in the areas of piston 82 and plunger 84. The pressure downstream of the throttle valve is impressed on an area equal to the area of piston 82 minus the area of plunger 86 and which plunger is smaller than tail rod 84 by a predetermined amount. The FIGURE 4 arrangement is entirely independent of system pressures and fluctuations thereof and will maintain the pump at a fixed stroke entirely independent of the load on the motor even though the pump pressure rises to its maximum. For that reason it is desirable to provide means for relieving excessive pressure in the system. According to this invention, this is accomplished by providing a relief valve 92 connected between the conduit leading to the left face of piston 82 and exhaust and which relief valve will open at a predetermined pressure to exhaust the left face of piston 82 whereby the pump will move quickly toward neutral.

A throttle valve 94 in the conduit leading from the downstream side of throttle valve 88 to the control unit provides for a pressure drop as soon as relief valve 92 opens, thus permitting the pump to move quickly toward neutral against substantially no resistance.

Relief valve 92 may be bypassed by the manual valve 96 so that the pump can be manually unloaded and upon opening of valve 96 the pump will idle at substantially zero pressure and displacement.

It will be evident that the valves 92, 94, and 96 could be utilized with any of the systems illustrated for obtaining the same added control features described in connection with FIGURE 4.

The arrangement described previously is entirely adequate where only a single motor is to be driven. However, in a great many instances, the pump will be employed to supply actuating fluid to more than one motor and these motors quite often will operate at different times.

With the arrangement previously described, the halting of either of the motors would cause the pump to go to neutral whereby no pressure fluid would be available for the other motor. The circuit arrangement of FIGURE 5 illustrates the manner in which the present invention can be practiced with more than one motor, and wherein a speed control is had with each of the motors and which speed controls are selective as to the individual motors.

In FIGURE 5, 100 represents a pump corresponding to pump 30 in FIGURE 1. This pump discharges pressure fluid to a conduit 102 leading through a choke valve 104 to a reversing valve 106 connected with a first fluid motor M1.

Conduit 102 leads through a second choke valve 108 to a second reversing valve 110 to which is connected a second fluid motor M2.

The downstream side of choke valve 104 is connected by conduit 112 through check valve 114 to a conduit 116 leading to the left side of control piston 118.

Similarly, the downstream side of choke valve 108 is connected by conduit 120 through a check valve 122 with conduit 116. A connection is taken from conduit 116 between the check valves and control piston 118 via conduit 124 to reservoir 126 through a relief valve 128 or through a bleeder arrangement 130.

The right side of control piston 118 is connected with the pressure side of pump 100 by conduit 132.

The FIGURE 5 arrangment provides for selective speed control of the two fluid motors and also provides that the pump will go on neutral when both motors are halted. The pump will go on stroke, however, when either of the reversing valves is shifted to actuate its pertaining motor.

This comes about because the left side of control piston 118 is either drained continuously through the bleed connection 130, or is drained by opening of relief valve 128. Thus, when either of the reversing valves is shifted so that the pertaining motor commences to move, a pressure drop will occur across the pertaining choke valve 104 or 108 and set into operation the stroke control system previously described.

During the operation of either of the motors, one or the other of the check valves 114 and 122 will isolate the circuit pertaining to the idle motor so that the speed control effected on the motor being actuated depends entirely upon the choke valve pertaining thereto whereby the speed controls for the separate motors are selective and individual.

The FIGURE 5 arrangement illustrates the manner in which the present invention can be practiced where more than one motor is to be actuated. In a grinding machine, for example, one motor would be the motor that reciprocates the bed of the machine as illustrated in FIGURE 1, and the other motor could be the wheel head elevating motor or the motor for reciprocating the wheel head transversely of the table.

It will be apparent that the system according to the present invention could be extended to more than two motors, and it will, therefore, be understood that as any motors as necessary could be connected with the pump and be individually controlled according to this invention.

From the foregoing, it will be seen that the present invention provides for a novel pump control that maintains the pump discharge substantially constant at all times without wasteful loss of power or overheating of the fluid in the system.

The control unit may be supplied separately for mounting on existing pumps of the nature referred to or can be combined with the pump at the time of manufacture thereof.

It will be understood that this invention is susceptible to modification in order to adapt it to different usages and conditions; and, accordingly, it is desired to comprehend such modifications within this invention as may fall within the scope of the appended claims.

We claim:

1. In a hydraulic circuit; a variable delivery pump having a shiftable flow control member, a hydraulic motor arranged in series with the pump to receive the entire discharge therefrom, a restrictor between the pump and the motor arranged to pass the entire discharge of the pump, a first fluid operable area pertaining to the flow control member responsive to fluid pressure for urging the flow control member toward increased stroke position and connected with the downstream side of said restrictor, a second fluid operable area arranged in opposition to said first fluid operable area and connected with the upstream side of said restrictor, there being a choke valve in the connection between the downstream side of said restrictor and said first fluid operable means, and means leading from said connection between the choke valve and the first fluid operable area for exhausting said first fluid operable area.

2. In a hydraulic circuit; a variable delivery pump having a shiftable flow control member, a hydraulic motor arranged in series with the pump to receive the entire discharge therefrom, a restrictor between the pump and the motor arranged to pass the entire discharge of the pump, a first fluid operable area pertaining to the flow control member responsive to fluid pressure for urging the flow control member toward increased stroke position and connected with the downstream side of said restrictor, a second fluid operable area arranged in opposition to said first fluid operable area and connected with the upstream side of said restrictor, there being a choke valve in the connection between the downstream side of said restrictor and said first fluid operable means, and means leading from said connection between the choke valve and the first fluid operable area for exhausting said first fluid operable area, said means comprising a relief valve.

3. In a hydraulic circuit; a variable delivery pump having a shiftable flow control member, a hydraulic motor arranged in series with the pump to receive the entire discharge therefrom, a restrictor between the pump and the motor arranged to pass the entire discharge of the pump, a first fluid operable area pertaining to the flow control member responsive to fluid pressure for urging the flow control member toward increased stroke position and connected with the downstream side of said restrictor, a second fluid operable area arranged in opposition to said first fluid operable area and connected with the upstream side of said restrictor, there being a choke valve in the connection between the downstream side of said restrictor and said first fluid operable means, and means leading from said connection between the choke valve and the first fluid operable area for exhausting said first fluid operable area, said means comprising a manually operable valve.

4. In a hydraulic circuit; a variable delivery pump having a shiftable flow control member, a hydraulic motor arranged in series with the pump to receive the entire discharge therefrom, a restrictor between the pump and the motor arranged to pass the entire discharge of the pump, a first fluid operable area pertaining to the flow control member responsive to fluid pressure for urging the flow control member toward increased stroke position and connected with the downstream side of said restrictor, a second fluid operable area arranged in opposition to said first fluid operable area and connected with the upstream side of said restrictor, there being a choke valve in the connection between the downstream side of said restrictor and said first fluid operable means, and means leading from said connection between the choke valve and the first fluid operable area for exhausting said first fluid operable area, said means comprising manually operable and pressure responsive valve means.

5. In a hydraulic circuit; a variable delivery pump having a shiftable flow control member, and said pump having an internal reaction tending to urge the flow control member toward neutral position when the pump is discharging under pressure, a hydraulic motor in series with the pump, and a restrictor in the connection between the pump and the motor, a first fluid operable area pertaining to the flow control member responsive to fluid pressure for urging the flow control member toward increased stroke position and connected with the downstream side of said restrictor, a second fluid operable area arranged in opposition with said first fluid operable area and connected with the upstream side of said restrictor, said second fluid operable area being smaller than said first fluid operable area by an amount sufficient to compensate for said reaction.

References Cited in the file of this patent

UNITED STATES PATENTS

| | | |
|---|---|---|
| 2,238,061 | Kendrick | Apr. 15, 1941 |
| 2,436,986 | Ashbaugh | Mar. 2, 1948 |
| 2,501,165 | Ferris | Mar. 21, 1950 |
| 2,600,632 | French | June 17, 1952 |
| 2,612,114 | Ernst | Sept. 30, 1952 |
| 2,921,439 | Krafft et al. | Jan. 19, 1960 |